United States Patent
Nakano

(10) Patent No.: US 6,732,519 B2
(45) Date of Patent: May 11, 2004

(54) PRESSURE HOLDING VALVE AND VEHICLE BRAKING DEVICE USING THE SAME

(75) Inventor: Keita Nakano, Itami (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 24 days.

(21) Appl. No.: 10/140,155

(22) Filed: May 8, 2002

(65) Prior Publication Data

US 2002/0174652 A1 Nov. 28, 2002

(30) Foreign Application Priority Data

May 25, 2001 (JP) ......................................... 2001-157303

(51) Int. Cl.[7] ............................. F16K 1/00; B60T 15/00
(52) U.S. Cl. ............................. 60/550; 60/582; 251/63
(58) Field of Search ........................ 60/547.1, 550, 60/582; 251/63, 63.5

(56) References Cited

U.S. PATENT DOCUMENTS 3,512,550 A * 5/1970 Ammann ...................... 251/63
4,703,978 A * 11/1987 Belart et al. ............... 60/547.1
5,577,384 A    11/1996 Watanabe et al.

FOREIGN PATENT DOCUMENTS

| JP | 2002-220042 | 8/2002 |
|---|---|---|
| WO | 02/24503 | 3/2002 |

* cited by examiner

*Primary Examiner*—Thomas E. Lazo
(74) *Attorney, Agent, or Firm*—Greenblum & Bernstein, P.L.C.

(57) ABSTRACT

A pressure-responsive type pressure holding valve is proposed which serves to hold the hydraulic pressure in a circuit connected to a spool valve. A piston valve biased by a spring is mounted in a housing formed with a valve chamber, a small-diameter bore and a large-diameter bore. The outer periphery of the small-diameter portion of the piston valve is sealed by a seal member. A first port opened and closed by a valve head at the tip of the piston valve is connected to a circuit that needs pressure holding, a second port to a circuit in which minute leak can occur, and a third port to a source of hydraulic pressure for opening the valve.

3 Claims, 3 Drawing Sheets

PRESSURE HOLDING VALVE AND VEHICLE BRAKING DEVICE USING THE SAME

BACKGROUND OF THE INVENTION

This invention relates to a pressure holding valve used in e.g. a vehicle brake device.

The vehicle brake device proposed by the present applicant in JP patent application 2001-14903 is shown in FIG. 4.

In the figure, a hydraulic pressure control device 1, in response to the depressing force applied to a brake pedal 3, amplifies brake hydraulic pressure supplied from a high-pressure source 2 by means of a proportional pressure control valve 4 and feeds it to wheel brakes 5 in the first line. The high-pressure source 2 has a motor-driven pump 2a and a pressure accumulator 2b.

Between the wheel brakes 5 in the first line and wheel brakes 6 in the second line, a copy valve 7 is provided. When the first line is pressurized, a piston 7a of the copy valve 7 is pushed rightwardly in the figure. In the initial stage of its travel, an input port 7b of the copy valve 7 will be closed, so that the wheel brakes 6 in the second line are also pressurized.

The proportional pressure control valve 4 has a spool valve 4a which receives introduced hydraulic pressure on its pressure-receiving surfaces having a difference in area by provision of a pin 4f. The spool valve 4a moves to a balance point where the sum of the thrust by hydraulic pressure and the force of a spring 4b balances relative to the force applied from the brake pedal 3, thereby changing over the connection of an output port 4d to an input port 4c and a discharge port 4e and adjusting the degree of opening of passages therebetween.

The proportional pressure control valve 4 includes a solenoid 8 that applies leftward (in the figure) magnetic attraction force to the spool valve 4a, and a permanent magnet 9 for applying magnetic repulsion to the spool valve 4a by supplying a current in a reverse direction to a coil 8a of the solenoid 8. Thus, not only control based on the will of the driver, but also control that is completely independent of the will of the driver and based on commands from an electronic control device (not shown) is possible.

Numeral 10 in FIG. 4 is a hydraulic pressure generator (master cylinder) provided as a failsafe means in case the high-pressure source 2 or the first line fails. It generates hydraulic pressure corresponding to the brake pedal depressing force by compressing brake fluid in a fluid chamber 10a with a first piston 10b.

If the hydraulic pressure adjusted by the proportional pressure control valve 4 is higher than the hydraulic pressure generated in the fluid chamber 10a, the input port 7b of the copy valve 7 is closed. Thus brake fluid from the fluid chamber 10a has nowhere to go. Thus, the operating amount applied to the first piston 10b from the brake pedal 3 is transmitted to a second piston 10c as it is. This force is transmitted via a spring 11 to the spool valve 4a to perform position control of the spool valve.

On the other hand, if the high pressure source 2 or the first line fails and no hydraulic pressure is generated in the first line, the input port 7b of the copy valve 7 is left open, so that hydraulic pressure generated in the fluid chamber 10a flows to the wheel brakes 6 in the second line. This assures that minimum braking force is supplied even if the first line fails.

If the wheel brake pressure is controlled to be lower than the will of the driver e.g. for regenerative braking, the hydraulic pressure adjusted by the proportional pressure control valve 4 may be lower than the pressure generated in the fluid chamber 10a. A relief valve 12 is provided to keep the input port 7b of the copy valve 7 from opening at this time. A check valve 13 permits return of fluid from downstream, bypassing the relief valve 12. A check valve 14 is provided for replenishment of fluid from a reservoir 15 if there is a possibility of the fluid amount in the copy valve 7 becoming insufficient due to increase in the fluid amount in the brakes in the second line e.g. due to wear of the pads.

The brake device of FIG. 4 holds hydraulic pressure accumulated in the high-pressure source with the proportional pressure control valve 4 while the ignition switch of the vehicle is off. But since the spool valve has a sliding clearance around the spool and minute leak occurs therefrom, if the ignition switch is off for a long time, hydraulic pressure accumulated in the high-pressure source may become lower than the desired value.

Such lowered pressure recovers as the vehicle is restarted and the pump 2a is driven. Thus, any special countermeasure is not necessarily needed. But it is needless to say that it is the best measure to prevent the pressure in the high-pressure source from decreasing to hold it to the desired level.

As a measure of holding pressure, it is conceivable to provide a solenoid valve which closes when the ignition switch is turned off, in a fluid line between the high-pressure source and the proportional pressure control valve. But this method is not preferable because it requires a new countermeasure against failure of the solenoid valve and electric lines.

An object of this invention is to prevent pressure drop of the high-pressure source due to leak from around the spool, which occurs if a pressure adjusting valve having a spool is used, without using a solenoid valve.

SUMMARY OF THE INVENTION

According to this invention, there is provided a pressure holding valve comprising a housing provided with a valve chamber having a valve seat, a small-diameter bore communicating with the valve chamber, a large-diameter bore communicating with the small-diameter bore, a first port opening to the center of the valve seat, a second port communicating with the first port through the valve chamber, and a third port communicating with the large-diameter bore, a piston valve having a valve head mounted in the valve chamber, a small-diameter portion slidably mounted in the small-diameter bore, and a large-diameter piston mounted in the large-diameter bore to partition the large-diameter bore into a front chamber and a rear chamber, the rear chamber being at the atmospheric pressure, a seal member liquid-tightly sealing around the small-diameter portion of the piston valve in the small-diameter bore, and a valve closing spring for biasing the piston valve to press the valve head against the valve seat to close the pressure holding valve, wherein if the hydraulic pressure at the first port drops to a predetermined value, the piston valve is closed by the force of the spring to shut off communication between the first port and the second port, and with the communication shut off, when hydraulic pressure is introduced from the third port into the front chamber of the large-diameter bore, the thrust of the piston valve overcomes the force of the spring, so that the first port and the second port communicate with each other.

If this pressure holding valve is provided with a fourth port in the housing and the rear chamber of the large-diameter bore is connected to a reservoir through the fourth port, the rear chamber of the large-diameter bore is filled with fluid introduced from the reservoir, so that the rear face of the piston and the inner surface of the large-diameter bore will not be exposed to the atmosphere.

There is also provided a vehicle braking device wherein the pressure holding valve is arranged between a high-pressure source having a pressure accumulator and a pressure adjusting valve for adjusting the pressure by displacement of a spool with the first port of the pressure holding valve connected to the high-pressure source, the second port to the pressure-adjusting valve, and the third port to the master cylinder.

While the hydraulic pressure at the first port exceeds a predetermined value, the thrust of the piston valve under the hydraulic pressure overcomes the force of the spring, so that the valve-open state is maintained. This allows free movement of hydraulic pressure between the first port and the second port.

While no hydraulic pressure is introduced into the front chamber of the large-diameter bore from the third port, if the hydraulic pressure at the first port drops to a predetermined value, it is closed by the force of the spring. This prevents release of hydraulic pressure to the second port, thus holding the pressure at the first port.

Further, when hydraulic pressure is introduced into the front chamber of the large-diameter bore from the third port while the valve is closed, thrust under the hydraulic pressure overcomes the force of the spring, so that the valve opens again. This permits free movement of hydraulic pressure between the first port and the second port.

Thus, by employing the pressure holding valve of this invention in a brake device as shown in FIG. 4, it becomes possible to hold the pressure of the high-pressure source without affecting the operation of the device whatsoever.

Since the pressure holding valve of this invention is a pressure-responsive valve, it is superior to solenoid valves in reliability.

Other features and objects of the present invention will become apparent from the following description made with reference to the accompanying drawings, in which:

DETAILED DESCRIPTION OF THE PREFERRED EMBODIMENT

Hereinbelow, the embodiment of this invention will be described with reference to FIGS. 1–3.

Figure 1:
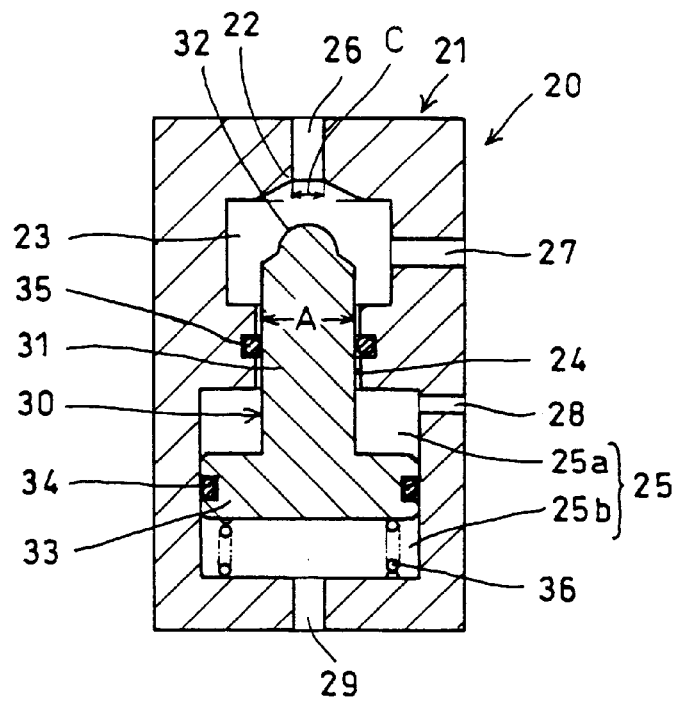
FIG. 1 is a sectional view showing an embodiment of the pressure holding valve of this invention.

As shown in FIG. 1, a pressure holding valve 20 comprises a housing 21, a piston valve 30, a seal member 35 and a spring 36.

The housing 21 is provided with a valve chamber 23 having a valve seat 22, a small-diameter bore 24 connected to the valve chamber 23, a large-diameter bore 25 connected to the small-diameter bore 24, a first port 26 opening to the center of the valve seat 22, a second port 27 communicating with the first port 26 through the valve chamber 23, and a third port 28 communicating with the large-diameter bore 25.

Also, the piston valve 30 is provided, at the tip of its small-diameter portion 31, with a valve head 32 so as to be brought into and out of contact with the valve seat 22. A large-diameter piston 33 is provided at the rear of the small-diameter portion 31. The latter is slidably inserted in the small-diameter bore 24 with the valve head 32 at its tip inserted into the valve chamber 23.

Also, a seal member 34 such as an O-ring is provided on the outer periphery of a piston 33. The piston 33 is disposed in the large-diameter bore 25 to partition the large-diameter bore into a front chamber 25a opposing the front face of the piston 33 and a rear chamber 25b opposing the rear face of the piston 33. Hydraulic pressure for opening the valve 20 is introduced into the front chamber 25a through the third port 28. The pressure holding valve 20 is provided, in the housing 21, with a fourth port 29, which is connected to a reservoir to introduce fluid at the atmospheric pressure into the rear chamber 25b from the reservoir to keep the rear chamber in a wet state. But the rear chamber may be open to the atmosphere.

The seal member 35 liquid-tightly seals between the small-diameter portion 31 of the piston valve 30 and the housing 21. The spring 36 is for closing the valve. When the valve head 32 is pressed against the valve seat 22 by the force of the spring 36, a fluid passage between the first port 26 and the second port 27 is closed as shown in FIG. 2.

Figure 3:
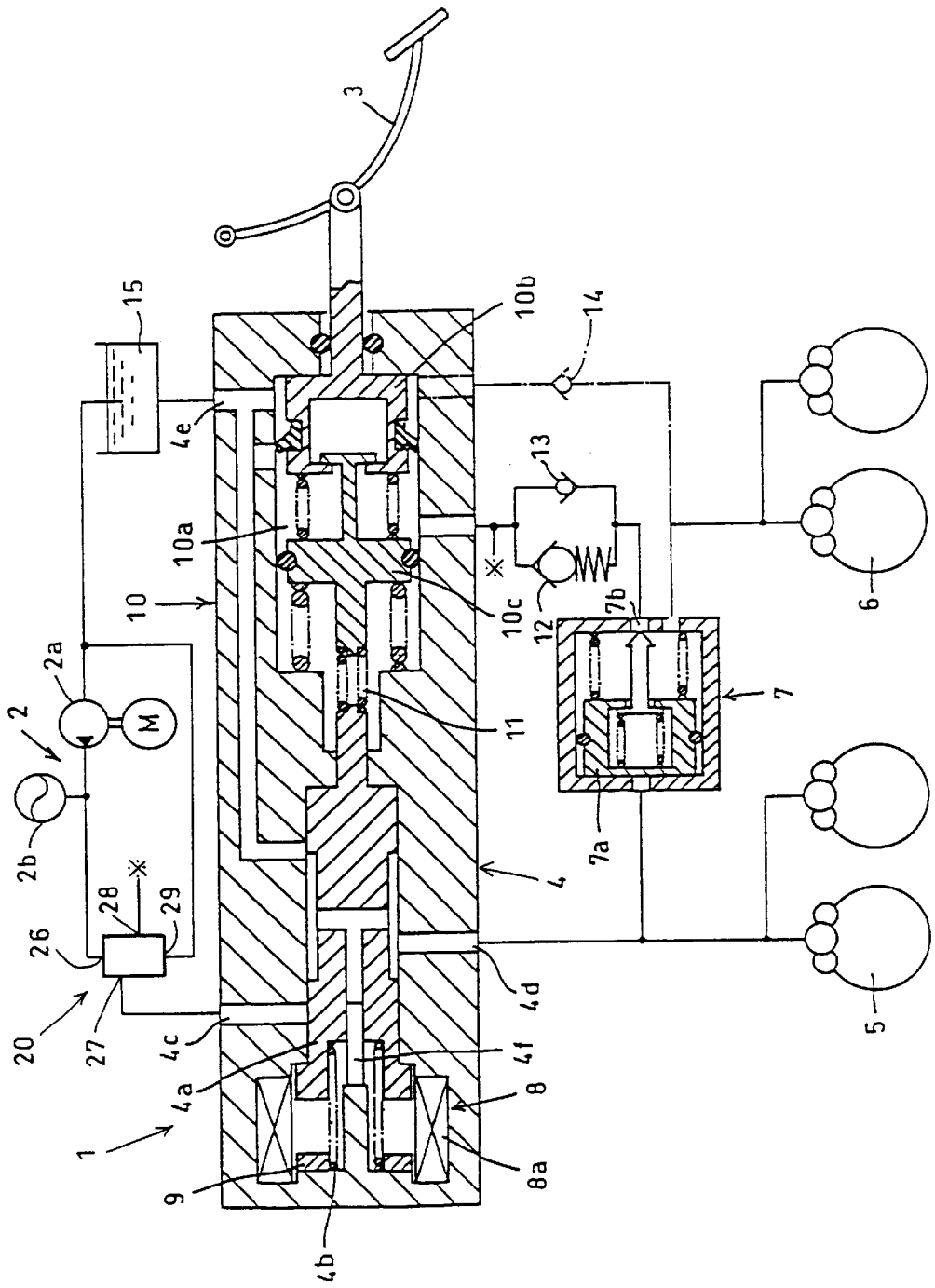
FIG. 3 is a view showing a vehicle braking device using the pressure holding valve of FIG. 1.
Figure 4:
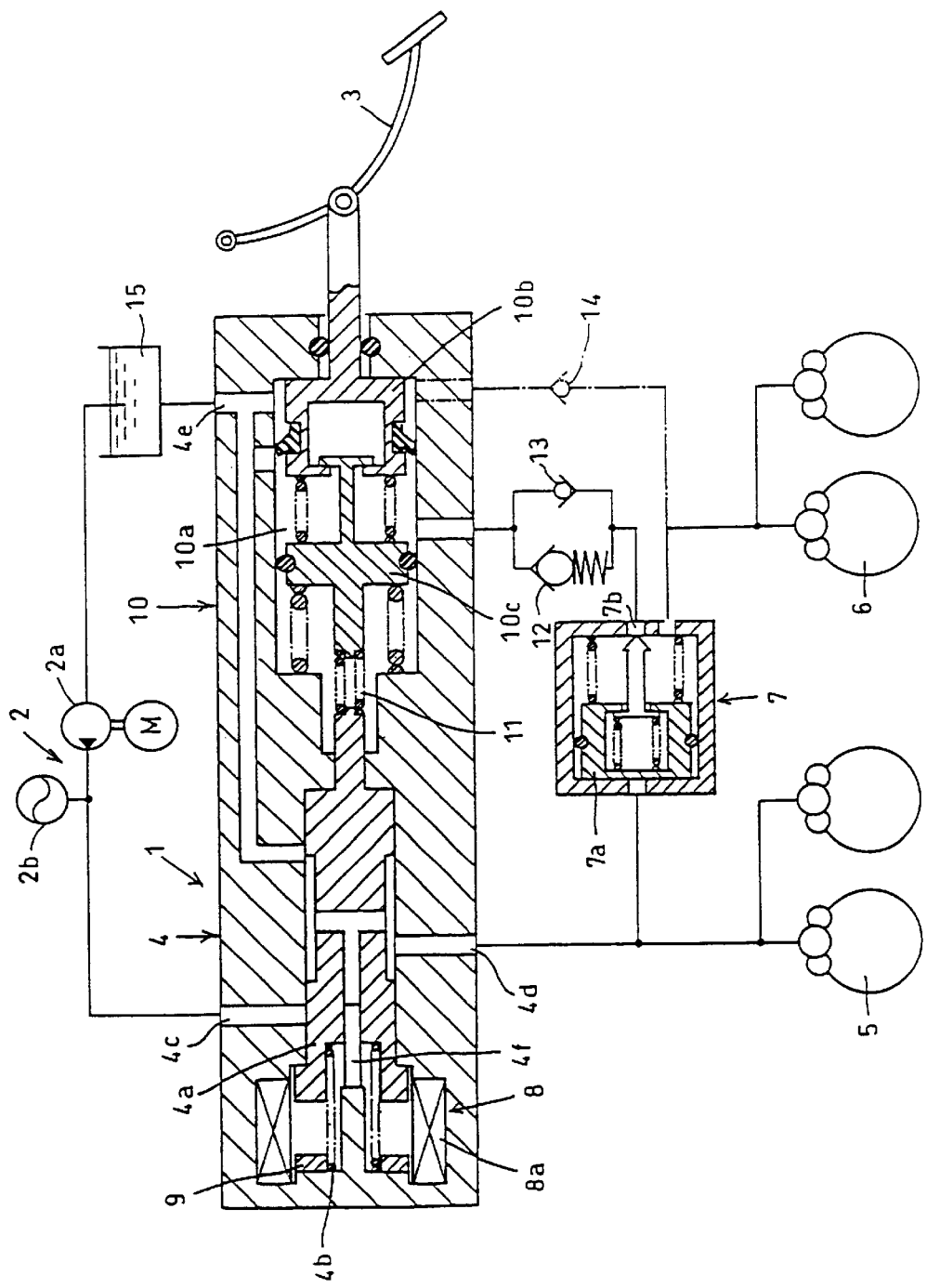
FIG. 4 is a view showing the vehicle braking device to be improved.

FIG. 3 shows an arrangement in which the pressure holding valve 20 of this invention is added to the brake device of FIG. 4. The pressure holding valve 20 has its first port 26 connected to the high-pressure source 2, its second port 27 to the input port 4c of the proportional pressure control valve 4, its third port 28 to the fluid chamber 10a of the hydraulic pressure generator (that is, master cylinder) 10, and its fourth port 29 to the reservoir 15, respectively.

In the arrangement of FIG. 3, while the high-pressure source 2 is normal or while high hydraulic pressure is accumulated in the high-pressure source 2 in the initial stage of failure of the electric line, as shown in FIG. 1, thrust of the piston valve under hydraulic pressure of the high-pressure source overcomes the force of the spring 36, so that the piston valve 30 is kept in its open position.

While the piston valve 30 is open as shown in FIG. 1, there will be no trouble when the proportional pressure control valve 4 of FIG. 3 is activated and hydraulic pressure from the high-pressure source is supplied to the wheel brakes.

Figure 2:
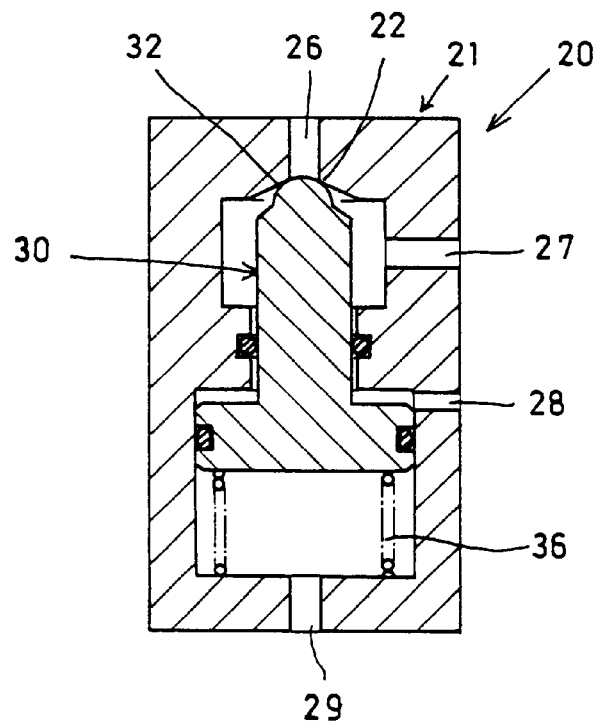
FIG. 2 is a sectional view of the same when it is closed.

When some time has passed after the ignition switch is turned off, so that the pressure of the high-pressure source 2 drops to a specified value due to leak from the proportional pressure control valve 4, the force of the spring 36 will overcome the thrust under hydraulic pressure, so that the piston valve 30 is closed as shown in FIG. 2. This prevents further reduction in pressure of the high-pressure source thereafter.

If the brake pedal is depressed immediately after the ignition switch is turned on with the piston valve 30 closed, or if the pump of the high-pressure source does not suck up fluid e.g. due to an electrical failure even when the ignition switch is turned on, and the brake pedal is depressed in this state, or if the brake pedal is depressed with the ignition switch off, hydraulic pressure from the hydraulic pressure generator 10 will be fed through the third port 28 into the front chamber 25a of the large-diameter bore 25, so that the piston valve 30 opens.

At this time, since hydraulic fluid is consumed to open the piston valve 30, there may be a slight delay in timing of the supply of hydraulic pressure to the wheel brakes. But since the pressure of the high-pressure source 2 is held at a predetermined level, the braking force obtained will be sufficient.

Besides, if the ignition switch is turned on with the piston valve 30 closed and the high-pressure source is activated normally, so that the reduced pressure recovers to a predetermined level, the piston valve 30 will open spontaneously even if the brake pedal is not depressed.

Assuming that the hydraulic pressure at the first port 26 is P1, the hydraulic pressure at the second port 27 is P2, the area of the valve seat 22 shown in FIG. 1 is C, the sectional area of the small-diameter portion 31 of the piston valve 30 is A, the force of the spring 36 is F, and the hydraulic pressure at the third port 28 is zero, the pressure holding valve 20 according to this invention opens while the condition of P1·C>F is met, and it closes when the condition of P2·A<F is met. Thus, if it is desired to afford allowance or the degree of freedom for the hydraulic pressure P1 at the first port 26 while the ignition switch is off have freedom, the difference between the sectional area A of the small-diameter portion 31 and the area C of the valve seat 22 is preferably as small as possible.

As described above, by using the pressure holding valve of this invention, if the hydraulic pressure of the high-pressure source connected to the first port drops to a prescribed value due to leak from the spool valve, it closes spontaneously, thereby preventing further pressure drop. Thus if it is used for a vehicle braking device that applies braking using hydraulic pressure of a high-pressure source, it is possible to generate a sufficient braking force with the accumulated pressure. Also, even if the high-pressure source should fail, while pressure is being accumulated, braking is possible with the accumulated pressure.

The pressure holding device of this invention can also be used e.g. in the following manner. Namely it is opened by pressurizing the third port, and in this state, hydraulic pressure is directed from the second port to the first port and then the third port is depressurized to hold the hydraulic pressure in the circuit connected to the first port. Its use is therefore not limited to a vehicle braking device.

What is claimed is:

1. A pressure holding valve comprising a housing provided with a valve chamber having a valve seat, a small-diameter bore communicating with said valve chamber, a large-diameter bore communicating with said small-diameter bore, a first port opening to the center of said valve seat, a second port communicating with said first port through said valve chamber, and a third port communicating with said large-diameter bore, a piston valve having a valve head mounted in said valve chamber, a small-diameter portion slidably mounted in said small-diameter bore, and a large-diameter piston mounted in said large-diameter bore to partition said large-diameter bore into a front chamber and a rear chamber, said rear chamber being at the atmospheric pressure, a seal member liquid-tightly sealing around said small-diameter portion of said piston valve in said small-diameter bore, and a valve closing spring for biasing said piston valve to press said valve head against said valve seat to close the pressure holding valve, wherein if the hydraulic pressure at said first port drops to a predetermined value, said piston valve is closed by the force of said spring to shut off communication between said first port and said second port, and with the communication shut off, when hydraulic pressure is introduced from said third port into said front chamber of said large-diameter bore, the thrust of said piston valve overcomes the force of said spring, so that said first port and said second port communicate with each other, wherein a fourth port is formed in said housing and connected to a reservoir to introduce fluid at the atmospheric pressure from said reservoir into the rear chamber of said large-diameter bore.

2. A vehicle braking device which comprises a high-pressure source having a pressure accumulator, a pressure adjusting valve including a spool valve for adjusting the pressure by displacement of said spool valve, and a master cylinder, and which is structured to pressurize wheel brakes with hydraulic pressure supplied from said high-pressure source through said pressure-adjusting valve while said high-pressure source and brake lines connected thereto are normal, further comprising the pressure holding valve claimed in claim 1, the first port of the pressure holding valve being connected to said high-pressure source, the second port to said pressure adjusting valve, and the third port to said master cylinder.

3. A vehicle braking device which comprises a high-pressure source having a pressure accumulator, a pressure adjusting valve including a spool valve for adjusting the pressure by displacement of said spool valve, and a master cylinder, and which is structured to pressurize wheel brakes with hydraulic pressure supplied from said high-pressure source through said pressure-adjusting valve while said high-pressure source and brake lines connected thereto are normal, further comprising a pressure holding valve comprising:

a housing provided with a valve chamber having a valve seat, a small-diameter bore communicating with said valve chamber, a large-diameter bore communicating with said small-diameter bore, a first port opening to the center of said valve seat, a second port communicating with said first port through said valve chamber, and a third port communicating with said large-diameter bore, a piston valve having a valve head mounted in said valve chamber, a small-diameter portion slidably mounted in said small-diameter bore, and a large-diameter piston mounted in said large-diameter bore to partition said large-diameter bore into a front chamber and a rear chamber, said rear chamber being at the atmospheric pressure, a seal member liquid-tightly sealing around said small-diameter portion of said piston valve in said small-diameter bore, and a valve closing spring for biasing said piston valve to press said valve head against said valve seat to close the pressure holding valve, wherein if the hydraulic pressure at said first port drops to a predetermined value, said piston valve is closed by the force of said spring to shut off communication between said first port and said second port, and with the communication shut off, when hydraulic pressure is introduced from said third port into said front chamber of said large-diameter bore, the thrust of said piston valve overcomes the force of said spring, so that said first port and said second port communicate with each other, the first port of the pressure holding valve being connected to said high-pressure source, the second port to said pressure adjusting valve, and the third port to said master cylinder.

* * * * *